United States Patent
Baugh (10) Patent No.: US 8,310,766 B2
(45) Date of Patent: Nov. 13, 2012

(54) TWO-DIMENSIONAL LENSING ARRANGMENT FOR OPTICAL BEAM COLLIMATION AND BEAM ORIENTATION

(76) Inventor: Brent Baugh, Palo Alto, CA (US)

( * ) Notice: Subject to any disclaimer, the term of this patent is extended or adjusted under 35 U.S.C. 154(b) by 288 days.

(21) Appl. No.: 12/456,145

(22) Filed: Jun. 12, 2009

(65) Prior Publication Data

US 2009/0316275 A1    Dec. 24, 2009

Related U.S. Application Data

(60) Provisional application No. 61/132,407, filed on Jun. 17, 2008.

(51) Int. Cl.
*G02B 27/30* (2006.01)
*G02B 27/10* (2006.01)

(52) U.S. Cl. ......... 359/641; 359/619; 359/624; 359/626

(58) Field of Classification Search .................. 359/641, 359/618, 619, 621–624, 626–628
See application file for complete search history.

(56) References Cited

U.S. PATENT DOCUMENTS

| | | | |
|---|---|---|---|
| 6,826,320 B2 | 11/2004 | Deliwala | |
| 6,953,271 B2* | 10/2005 | Aynie et al. | 362/511 |
| 7,123,417 B2* | 10/2006 | Ishikawa et al. | 359/618 |
| 7,162,124 B1 | 1/2007 | Gunn, III et al. | |
| 2004/0240798 A1 | 12/2004 | Bauer | |
| 2005/0175306 A1 | 8/2005 | Chong et al. | |
| 2006/0045420 A1 | 3/2006 | Doerr et al. | |
| 2007/0165980 A1 | 7/2007 | Jenkins et al. | |

* cited by examiner

*Primary Examiner* — Jack Dinh
(74) *Attorney, Agent, or Firm* — Wendy W. Koba (57) ABSTRACT

An arrangement for collimating and turning an optical beam utilizing a pair of two-dimensional lenses to separate the collimation into separate one-dimensional operations, while using one of the two-dimensional lenses to also perform the turning operation. A first two-dimensional lensing surface is disposed at the endface of a launching waveguide. This first two-dimensional lensing surface provides collimation along one axis of the system (for example, the X axis). A second two-dimensional lensing surface is provided by introducing a defined curvature to a turning mirror in the system. The curvature of the turning mirror is designed to create collimation (or focusing, if desired) in the orthogonal beamfront (in this case, the Y axis beamfront), while also re-directing the propagating signal into the desired orientation.

12 Claims, 7 Drawing Sheets

TWO-DIMENSIONAL LENSING ARRANGMENT FOR OPTICAL BEAM COLLIMATION AND BEAM ORIENTATION

CROSS-REFERENCE TO RELATED APPLICATION

This application claims the benefit of U.S. Provisional Application No. 61/132,407, filed Jun. 17, 2008, which is herein incorporated by reference.

TECHNICAL FIELD

The present invention relates to an arrangement for collimating and turning an optical beam and, more particularly, to the use of a pair of two-dimensional lenses to separate the collimation into one-dimensional operations, while using one of the two-dimensional lenses to also perform the turning operation.

BACKGROUND OF THE INVENTION

In many optical systems, it is necessary to manipulate a propagating optical signal from one plane to another within a substrate-based optical arrangement. Electro-optic devices, such as waveguides, generally feature two primary planes—one parallel to the substrate and one perpendicular (normal) to that substrate. Often, the orientation of the optical beam needs to be turned 90° to redirect it from one plane to another.

Figure 1:
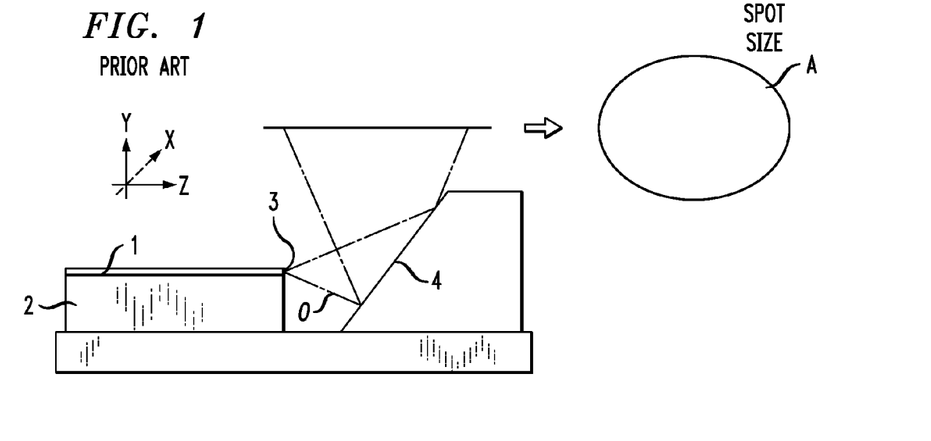
FIG. 1 is a side view of a prior art optical turning mirror arrangement.
Figure 2:
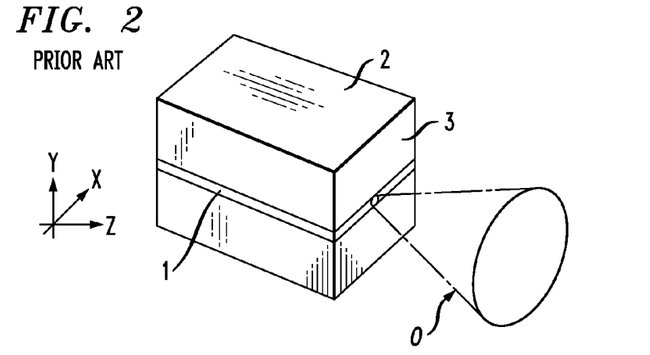
FIG. 2 is an isometric view of a portion of the arrangement of FIG. 1, illustrating the conic beamfront emerging from the endface of the optical waveguide.
Figure 3:
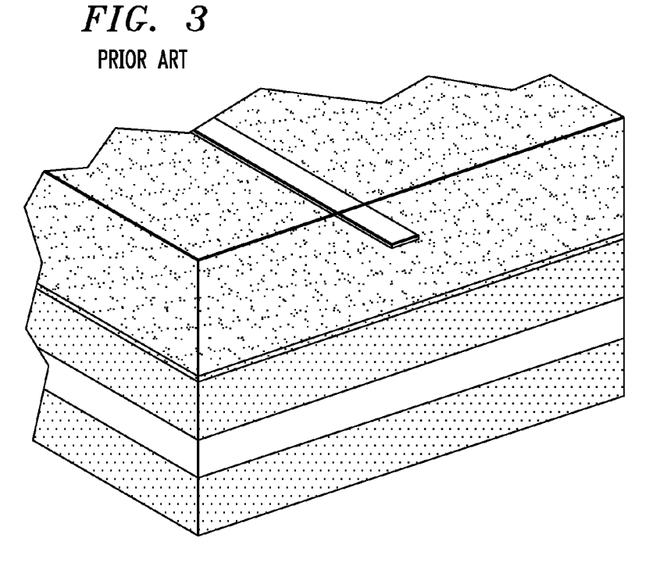
FIG. 3 is an enlarged view of the endface of the optical waveguide as shown in FIG. 1.

FIGS. 1-3 illustrate a prior art arrangement that is used to provide re-direction of an optical signal from one orientation to another. FIG. 1 is a side view, illustrating an optical waveguide 1 formed along a portion of an optical substrate 2. An optical beam O exiting endface 3 of waveguide 1 will expand in all three dimensions as it propagates outward from waveguide 1, forming a conic wavefront as shown in the isometric view of FIG. 2. The Cartesian XYZ coordinates as will be used throughout this discussion are illustrated in both FIGS. 1 and 2, where the Z-axis is defined as the optical axis of waveguide 1 and the XY plane defines endface 3.

In order to turn optical beam O and re-direct it into a waveguide in another plane (for example, "above" waveguide 1), an angled reflecting surface is often used, shown as reflecting surface 4 in FIG. 1. Reflecting surface 4 is disposed along the output signal path from waveguide 1, in this case defined as the Z-axis of the system. Reflecting surface 4 will intercept the propagating beam and, in this configuration, direct it upwards. Generally referred to in the optics art as a "turning mirror", reflecting surface 4 may advantageously be formed of the same silicon material as the remainder of the arrangement and fabricated using CMOS processing to create the desired angle of reflection. For the purposes of the present discussion, the phrase "turning mirror" will be hereinafter used to describe this component.

Inasmuch as waveguide 1 terminates as a perpendicular facet at endface 3 (see FIG. 3 for an enlarged illustration of endface 3), expansion of the beam in the XY plane will continue, causing the signal power to spread across a relatively large surface area, as illustrated by the conic wavefront shown in FIG. 2. Moreover, the beam expansion will continue after the signal has been re-directed by turning mirror 4. Plane 5 and associated spot size image A in FIG. 1 illustrates the degree of expansion which has occurred by the time optical beam O has exited waveguide 1 and been re-directed by turning mirror 4.

This constant expansion thus results in reducing the optical power present at any point along a surface (such as plane 5). When re-directing an optical signal into a waveguide, optical receiving device, or the like, it would be preferable to control the spot size of the re-directed beam so as to improve the coupling efficiency of the propagating optical signal into the other waveguide, optical receiving device, or the like. That is, it is desirable to limit the expansion of the optical wavefront along axes perpendicular to the direction of signal propagation (i.e., when propagating along the Z-axis, limit expansion in the XY plane).

SUMMARY OF THE INVENTION

The need remaining in the prior art is addressed by the present invention which relates to an arrangement for collimating and turning an optical beam and, more particularly, to the use of a pair of two-dimensional lenses to separate the collimation into separate one-dimensional operations, while using one of the two-dimensional lenses to also perform the turning operation.

In accordance with the present invention, a first two-dimensional lensing surface is disposed at the endface of a launching waveguide. This first two-dimensional lensing surface provides collimation along one axis of the system (for example, the X axis). A second two-dimensional lensing surface is provided by introducing a defined curvature to a turning mirror in the system. The curvature of the turning mirror is designed to create collimation (or focusing, if desired) in the orthogonal beamfront (in this case, the Y axis beamfront), while also re-directing the propagating signal into the desired orientation.

It is an advantage of the present invention that by separating the collimation problem into two, independent one-dimensional collimating operations (e.g., first X, then Y), a relatively simple arrangement can be used to create a fully collimated signal relatively early in the overall system architecture.

While the present invention will be described below in terms of an integrated, silicon-based embodiment, it is to be understood that the general collimation and orientation configuration of the present invention is not so limited. In particular, discrete optical components (lenses, gratings, mirrors, prisms and the like) may be used with any type of incoming (expanding) optical signal to provide the two-step collimation and turning operations of the present invention.

The ability to integrate the objects within a silicon platform, however, is considered advantageous for many arrangements, particularly where an array structure is used and a plurality of incoming optical signals needs to be collimated and re-oriented. Indeed, the ability to form an integrated, monolithic coupling arrangement using known CMOS processing technologies is considered to be a significant advantage over the prior art, particularly in terms of cost, size and reproducibility. A preferred embodiment of a silicon-based arrangement comprises a silicon-on-insulator (SOI) configuration, with the incoming signal propagating along a waveguide formed in a thin surface silicon layer of the SOI configuration.

These and other advantages and arrangements of the present invention will become apparent during the course of the following discussion and by reference to the accompanying drawings.

BRIEF DESCRIPTION OF THE DRAWINGS

Referring now to the drawings, where like numerals represent like components in several views.

DETAILED DESCRIPTION

In accordance with the present invention, improvement in coupling efficiency for a re-directed optical signal is achieved by incorporating a pair of separate two-dimensional lensing surfaces into the arrangement to perform collimation along two axes while also providing the desired re-direction of the signal. The coupling system of the present invention comprises a first two-dimensional lensing surface disposed at the endface of an optical waveguide to provide collimation along a first axis. A second two-dimensional lensing surface is provided by introducing curvature into an associated turning mirror (or other re-directing device) to provide both the desired collimation (or focusing) along a second, orthogonal axis and re-direction of the signal along another direction.

Figure 4:
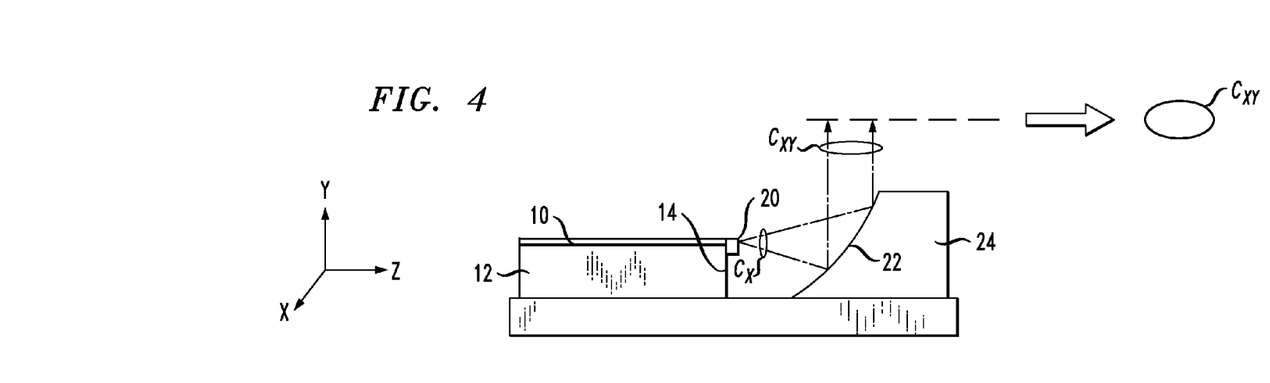
FIG. 4 is a side view of an exemplary embodiment of the present invention.

FIGS. 4-7 illustrate an exemplary embodiment of the present invention. In particular, FIG. 4 is a side view of an exemplary substrate-based optical system utilizing the coupling arrangement of the present invention. The optical system comprises an optical waveguide 10 formed along an optical substrate 12 and terminating at an endface 14 of substrate 12. As with the prior art arrangement described above, the optical signal is defined as propagating along the Z-axis of the system, where endface 14 defines the XY plane of the optical system.

Figure 5:
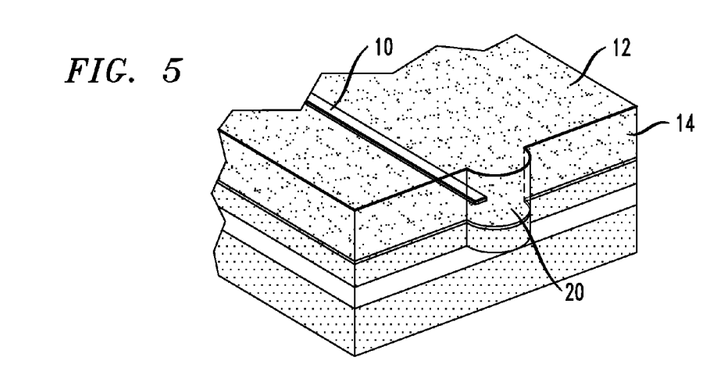
FIG. 5 is an enlarged, isometric view of the waveguide endface of the arrangement of the present invention showing, in particular, the positioning of the first two-dimensional lensing surface with respect to the waveguide termination.

In accordance with the present invention, a first collimation operation is performed by a two-dimensional lensing surface 20 formed at the termination of waveguide 10 along endface 14. Two-dimensional lensing surface 20 is configured, in this example, to collimate the X-axis wavefront of the propagating optical beam. For the purposes of the present invention this collimated signal is designated as $C_X$. FIG. 5, an enlarged isometric view of a portion of endface 14, best illustrates the location and shape of an exemplary two-dimensional lensing surface 20. In a preferred embodiment of a silicon-based optical system, techniques such as reactive ion etching or plasma etching may be used to create the cylindrical profile of lensing surface 20 along endface 14.

While two-dimensional lensing surface 20 is shown in this example as being cylindrical in structure, it is to be understood that various other two-dimensional geometries may be used, when appropriate. In particular, a grating element or Fresnel structure may be used as two-dimensional lensing surface 20. Again, the preferred silicon-based optical system embodiment can utilize CMOS processing techniques to create a grating, Fresnel structure, or any other appropriate two-dimensional lensing surface. In general, any configuration which will provide collimation along one axis may be used as a two-dimensional lensing surface in accordance with the present invention.

Figure 6:
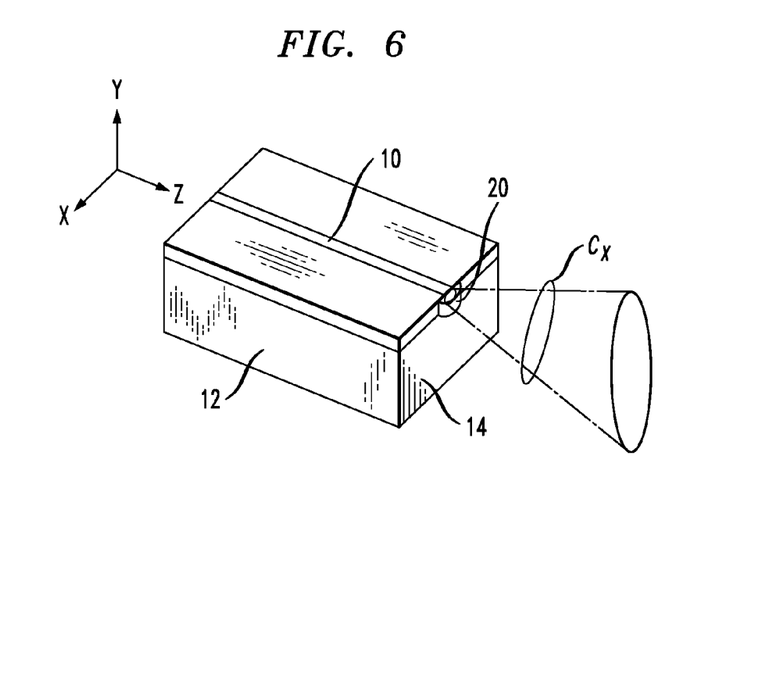
FIG. 6 is an isometric view of a portion of the arrangement of FIG. 4, illustrating the truncated conic beamfront emerging from the first two-dimensional lensing surface.
Figure 7:
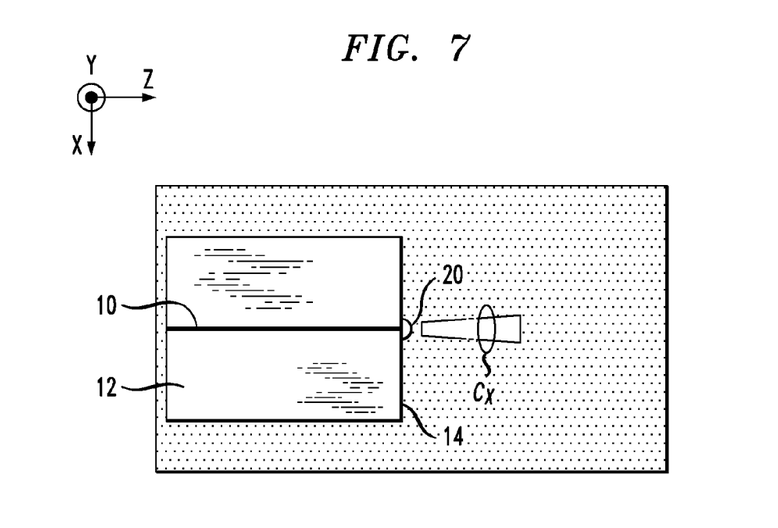
FIG. 7 is a top view of the embodiment of FIG. 4.

FIG. 6, which is an isometric view of optical substrate 12 and lensing surface 20, shows the truncated conic geometry of collimated signal $C_X$. That is, lensing surface 20 provides collimation along the X-axis and limits the expansion of the beam in this particular direction. As shown, the beam exiting two-dimensional lensing surface 20 will continue to propagate along the Z-axis and will continue to expand in the Y-axis direction. FIG. 7 is a top view of the embodiment of FIG. 4, showing in particular the relationship between first lensing surface 20 and collimated beam $C_X$ as formed in accordance with the present invention.

As described above, the coupling system of the present invention includes a second two-dimensional lensing surface. Referring to FIG. 4, this second two-dimensional lensing surface takes the form of a curved surface 22 of a turning mirror 24. Turning mirror 24 is disposed along the Z-axis of the optical system and positioned to intercept the collimated bean $C_X$ exiting two-dimensional lensing surface 20.

In this example, turning mirror 24 is used to re-direct the X-axis collimated beam $C_X$ upwards, providing collimation of propagating collimated beam $C_X$ along the orthogonal axis (referred to herein as the Y axis), thus forming a signal which is also collimated along the Y axis, defined as collimated beam $C_{XY}$. As will be described below, the curvature of second two-dimensional lensing surface 22 may be configured to provide, for example, focusing instead of collimation. In one embodiment, for example, a parabolic-shaped lensing surface may be used.

In general, the operation performed by second two-dimensional lensing surface 22 may be defined as "beam shaping", where this shaping is considered to include both collimation and focusing. Again, the use of silicon-based arrangement as the preferred embodiment of the present invention allows for the curvature of surface 22 to be controlled through well-known CMOS fabrication processes to provide the desired type of beam shaping. Indeed, an integrated monolithic optical system can be provided where optical substrate 12 and turning mirror 24 are disposed on and formed within a common silicon substrate 15.

The difference between expanding beam O of the prior art (FIG. 1) and twice-collimated beam $C_{XY}$ of the present invention (FIG. 4) is evident in these views and is most particularly demonstrated by comparing the spot size of beam O in FIG. 1 and the spot size of beam $C_{XY}$ in FIG. 4. The narrowed, concentrated area of beam $C_{XY}$ ensures that most of the propagating signal will ultimately be coupled into an associated optical signal path, receiver, fiber, etc.

In embodiments where optical substrate 12 and optical waveguide 10 are part of a silicon-based optical system, CMOS processing and fabrication techniques can be used to form a lensing surface as an integral part of the system, where in the above-described embodiment two-dimensional lensing surface 20 is shown as created directly along endface 14 as an integral part of substrate 12. The ability to create an integrated, monolithic structure allows for the lensing surface to be precisely aligned with the optical waveguide without needing to perform any separate alignment and attachment processes. Moreover, as will be discussed below, the utilization of a silicon-based arrangement and the ability to integrate the lensing surfaces directly into the structure allows for an array of structures to be easily formed and reproduced. Indeed, a preferred silicon-based optical system comprises an SOI structure, with waveguide(s) formed in a surface silicon layer of an SOI structure; the lensing surfaces are likewise formed of silicon and integrated within the SOI structure.

Figure 8:
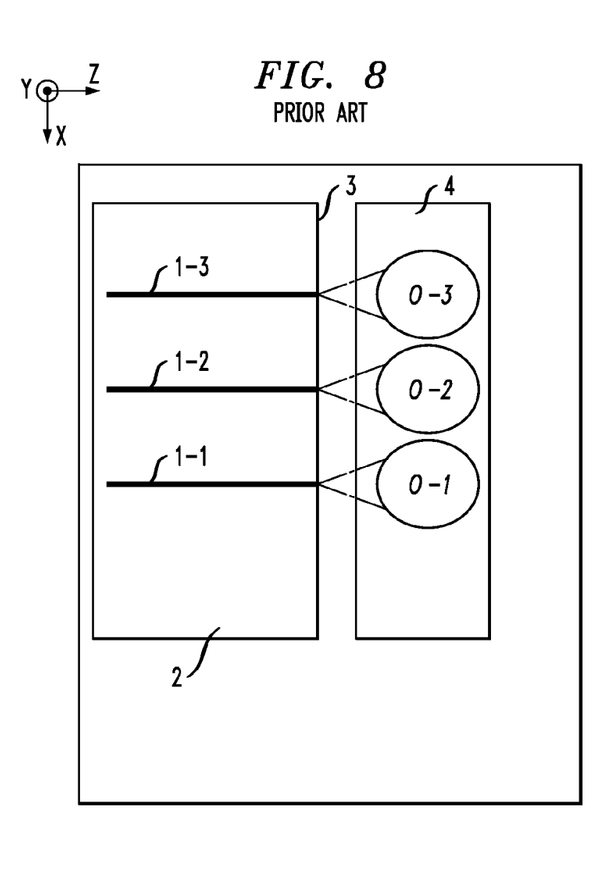
FIG. 8 is a top view of a prior art array arrangement.

FIG. 8 is a top view of a prior art array waveguide and turning mirror structure, including a plurality of separate waveguides 1-1, 1-2 and 1-3, all formed within substrate 2. A single, extended turning mirror surface 4 is used in this case to intercept the plurality of optical beams O-1, O-2 and O-3, directing them upwards as shown. The spot size of the expanding beams is also illustrated in FIG. 8.

Figure 9:
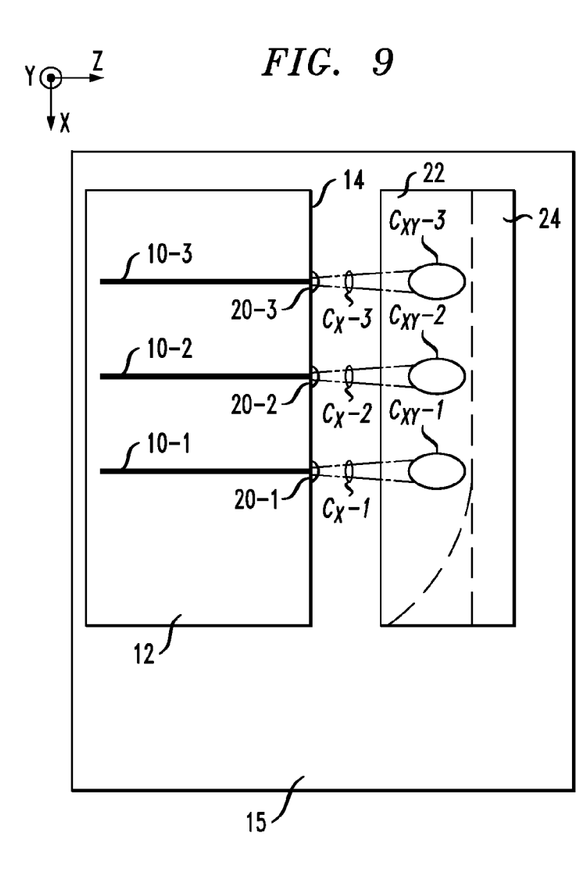
FIG. 9 is a top view of an array arrangement formed in accordance with the present invention.
Figure 10:
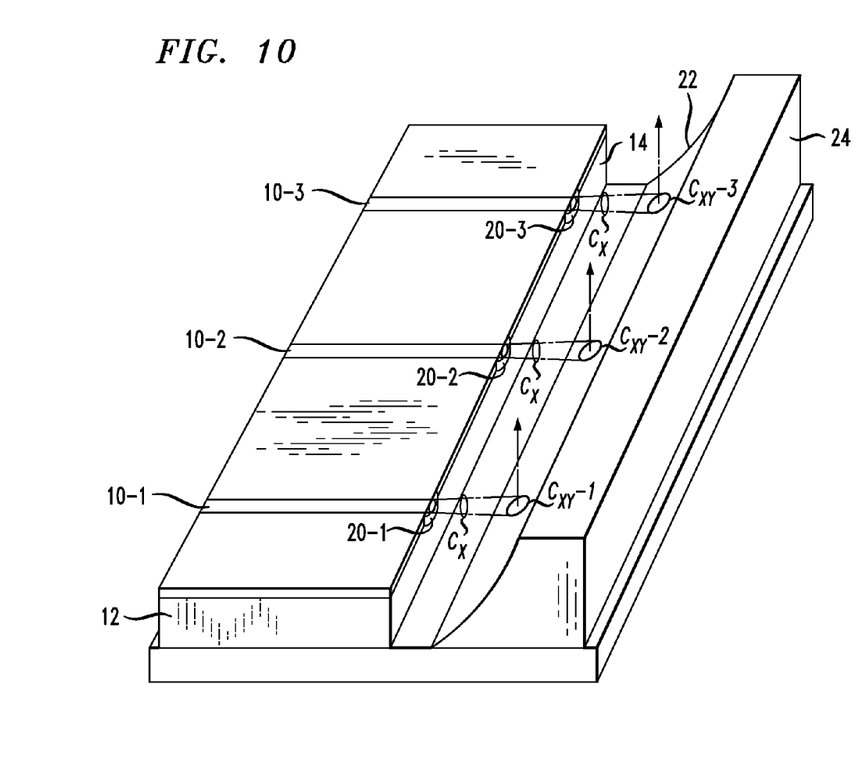
FIG. 10 is an isometric view of the array arrangement of FIG. 9.

FIG. 9, alternatively, illustrates the use of a plurality of cylindrical (for example) lenses 20-1, 20-2 and 20-3 in combination with a plurality of waveguides 10-1, 10-2 and 10-3 to form a plurality of x-axis collimated beams $C_X$-1, $C_X$-2 and $C_X$-3, in accordance with the teachings of the present invention. FIG. 10 is an isometric view of the arrangement of FIG. 9. Lenses 20-1, 20-2 and 20-3 are individually formed along endface 14 of optical substrate 12. Advantageously, CMOS processing may be used to ensure that each lens is properly aligned with its associated waveguide, and that each lens exhibits the same curvature. Although the arrangement shown in FIGS. 9 and 10 only illustrate a set of three waveguides, it is to be understood that any desired number of waveguides and associated lensing surfaces may be formed in alignment thereto.

As best shown in FIG. 10, a single curved surface 22 is preferably used to separately collimate each beam along the Y axis, while also directing the plurality of beams upward. These twice-collimated beams are shown as $C_{XY}$-1, $C_{XY}$-2 and $C_{XY}$-3 in FIGS. 9 and 10. Advantageously, the formation of an integrated array structure allows for alignment to be maintained without the need to separately align each pair of lensing surfaces with its associated waveguide.

Figure 11:
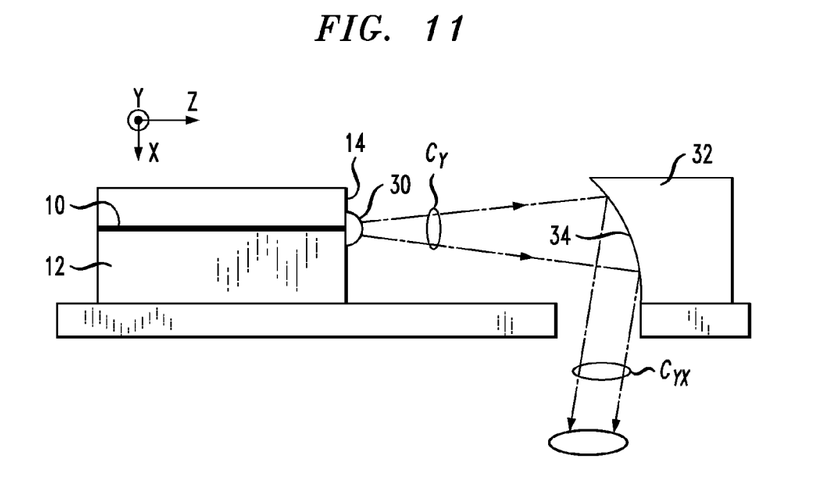
FIG. 11 is a side view of an alternative embodiment of the present invention, performing X-axis collimation after Y-axis collimation.

While the arrangements described above illustrate the use of a first two-dimension lensing surface to provide X-axis collimation and a curved turning mirror to provide Y-axis collimation, it is also possible to reverse these operations. FIG. 11 illustrates an alternative embodiment of the present invention where a first lensing surface 30 is configured to provide Y-axis collimation of a beam exiting at endface 14 of waveguide 10 and an associated turning mirror 32 is formed to exhibit a curved surface 34 (along the X-axis) to provide both X-axis collimation and beam re-direction. In this example, the beam is directed downward, perhaps into a photoreceiving device (not shown).

Figure 12:
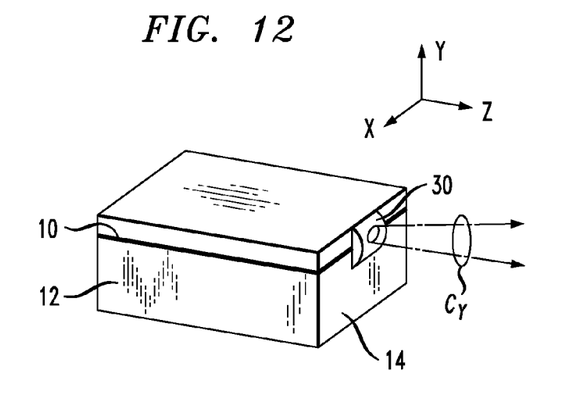
FIG. 12 is an isometric view of a portion of the arrangement of FIG. 10, illustrating the truncated conic beamfront emerging from the Y-axis lensing surface.

FIG. 12 is an isometric view of the waveguide portion of this embodiment, illustrating the orientation of a two-dimensional lensing surface with respect to endface 14. As with the embodiments described above, when fabricated as a preferred silicon-based configuration, two-dimensional lensing surface 30 may be formed as an integral part of substrate 12 along endface 14 at waveguide 10. The ability to form an integrated structure eliminates the need to align and affix one component to another. The use of a silicon-based embodiment also allows for curved surface 32 to be formed using known CMOS processing to provide both the desired degree of X-axis collimation and re-direction of the propagating, collimated beam $C_{YX}$. It is to be noted that the subscripts associated with collimated signal "C" denote the order of the collimation along the two axes (i.e., XY or YX).

Figure 13:
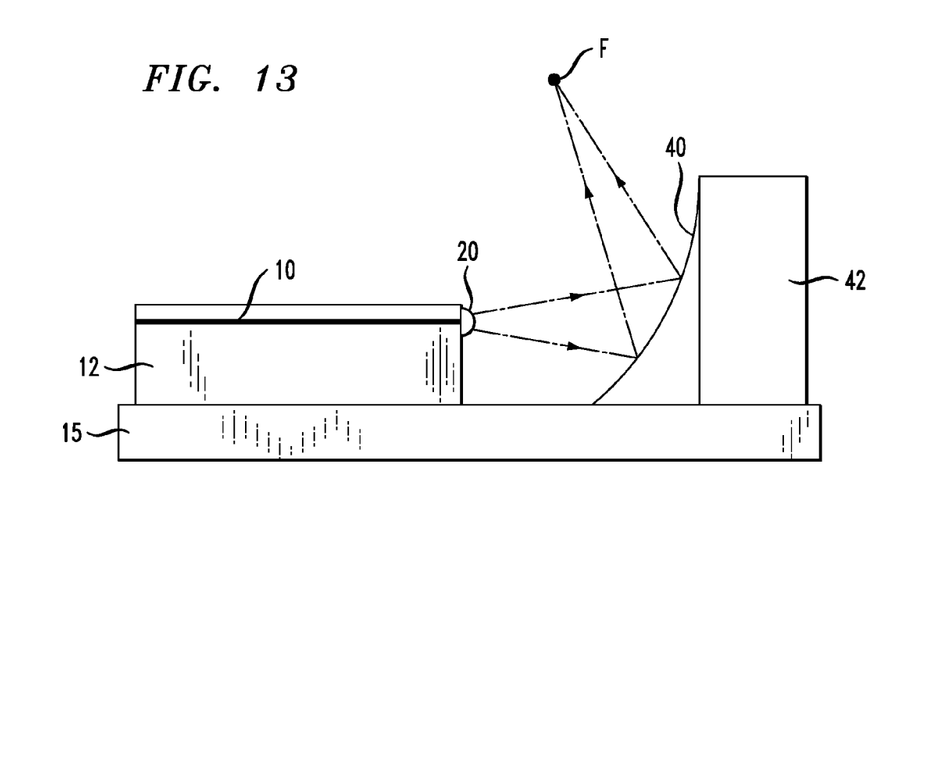
FIG. 13 is a side view of yet another embodiment of the present invention, in this case including a parabolically-curved second lensing surface, performing focusing of the re-directed optical beam.

Moreover, as mentioned above, the degree of curvature in the second lensing surface may be used to further narrow the impinging beam, so as to focus into a smaller spot size than achieved merely by collimating the signal. FIG. 13 shows an optical coupling system of the present invention wherein a parabolic curvature is introduced into a curved surface 40 of a turning mirror 42, creating a propagating signal with a focused spot size F, as shown. While this embodiment shows the use of a parabolic shape, other curvatures may be used to provide focusing and/or collimation as desired.

While the above embodiments have been described in terms of a substrate-based optical system comprising silicon components (which may be readily formed and aligned using CMOS processes), it is also possible to form the dual two-dimensional collimation and re-direction coupling system of the present invention with discrete devices. In general, while the foregoing description represents exemplary embodiments of the present invention, it will be obvious to those skilled in the art that various modifications may be made without departing from the spirit and scope of the invention as defined by the claims appended hereto.

What is claimed is:

1. An optical system for collimating and re-directing an expanding optical signal, the system comprising:
   an optical substrate including an optical waveguide formed therealong, the optical substrate including an endface termination perpendicular to the direction of the optical waveguide, such that the expanding optical signal exits the optical waveguide3 along the optical substrate endface termination;
   a first two-dimensional lensing surface disposed to intercept the expanding optical signal and perform collimation of said expanding optical signal along a first axis, forming a first collimated optical signal; and
   a second two-dimensional lensing surface disposed to intercept the first collimated optical signal and perform beam shaping of the first collimated optical signal, forming a beam-shaped optical signal and re-directing the beam-shaped optical signal along a second, orthogonal axis.

2. The optical system as defined in claim 1 wherein the second two-dimensional lensing surface is configured to perform beam shaping by collimating the first collimated optical signal along the second, orthogonal axis to form a fully collimated optical output signal.

3. The optical system as defined in claim 1 wherein the second two-dimensional lensing surface is configured to perform beam shaping by focusing the first collimated optical signal along the second, orthogonal axis, forming a collimated, focused optical output signal.

4. The optical system as defined in claim 1 wherein the optical system is formed of silicon-based optical elements.

5. The optical system as defined in claim 4 wherein at least one of the first and second two-dimensional lensing surfaces is formed as an integrated, silicon-based component associated with the silicon-based optical elements.

6. The optical system as defined in claim 5 wherein at least one of the first and second two-dimensional lensing surfaces are selected from the group consisting of: lenses, gratings, Fresnel surfaces and prisms, or any combination thereof.

7. The optical system as defined in claim 5 wherein at least one of the first and second two-dimensional lensing surfaces are formed using CMOS fabrication processes on the silicon-based optical elements.

8. The optical system as defined in claim 7 wherein the first lensing surface is formed by etching the endface termination of the optical substrate.

9. The optical system as defined in claim 5 wherein the optical system comprises a silicon-on-insulator (SOI) optical arrangement.

10. An optical system for collimating and re-directing a plurality of expanding optical signals, the system comprising:
 a silicon-based system including an optical substrate comprising a plurality of optical waveguides, with a plurality of expanding optical signals exiting along an endface termination of the optical substrate;
 a plurality of two-dimensional lensing surfaces disposed to intercept the plurality of expanding optical signals in a one-to-one relationship, each two-dimensional lensing surface performing collimation of said associated expanding optical signal along a first axis, the plurality of two-dimensional lensing surfaces forming a plurality of collimated optical signals; and
 a single two-dimensional lensing surface disposed to intercept the plurality of collimated optical signals and perform beam shaping on each collimated optical signal of the plurality of collimated optical signals, forming a plurality of beam-shaped optical signals and re-directing the plurality of beam-shaped optical signals along a second, orthogonal axis.

11. The optical system as defined in claim 10 wherein the plurality of two-dimensional lensing surfaces are disposed along the endface termination of the optical substrate in alignment with the plurality of optical waveguides.

12. The optical system as defined in claim 10 wherein the silicon-based system comprises an SOI-based system.

* * * * *